G. A. & E. HAGSTROM.
DETACHABLE TIRE TREAD.
APPLICATION FILED OCT. 5, 1914.
1,173,424.
Patented Feb. 29, 1916.
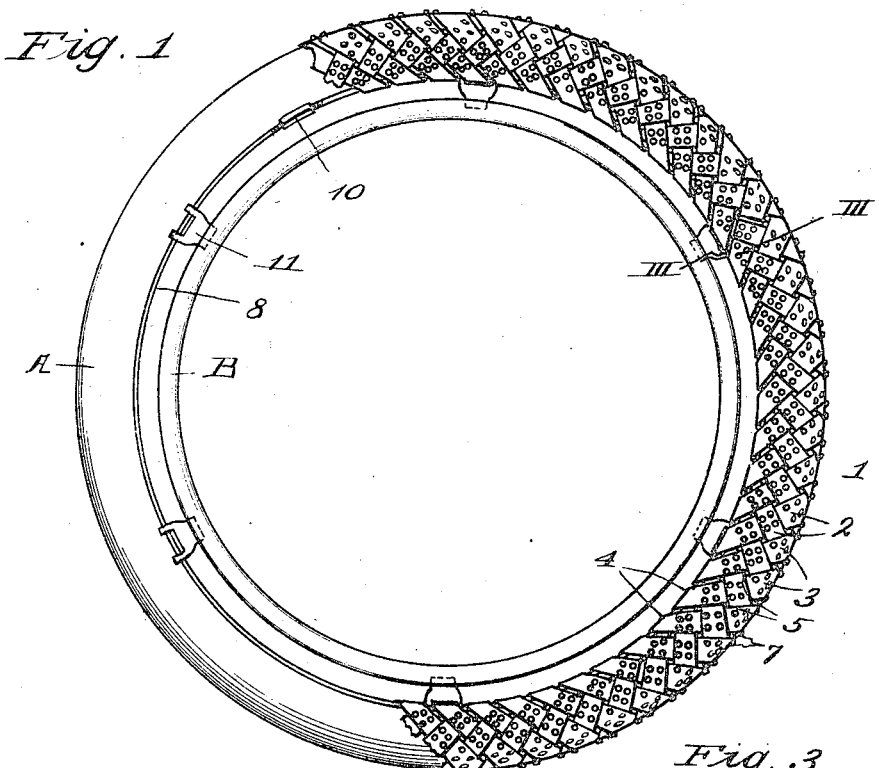
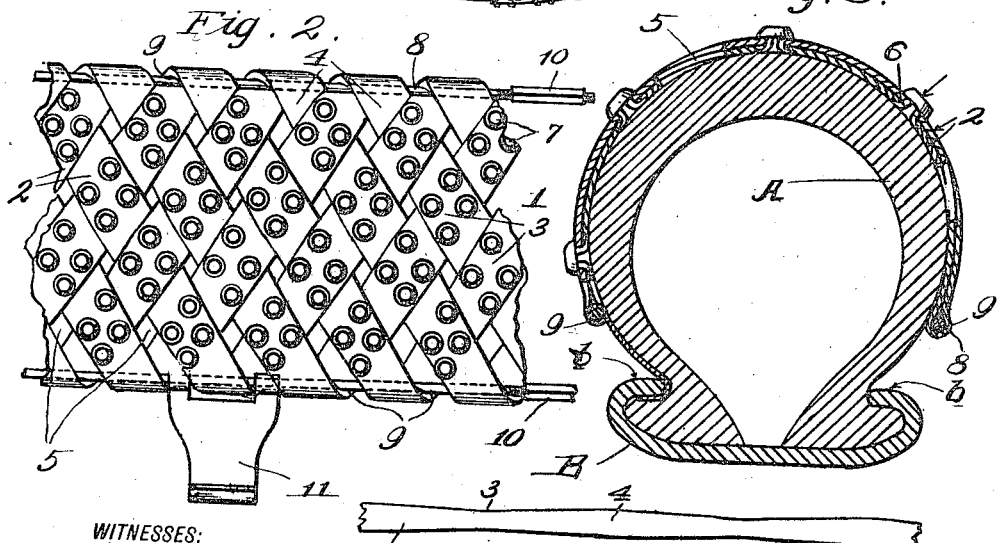
WITNESSES:
INVENTORS:
Gustaf A. Hagstrom
and Emanuel Hagstrom,
BY
F. G. Fischer
ATTORNEY.

UNITED STATES PATENT OFFICE.

GUSTAF A. HAGSTROM, OF KANSAS CITY, MISSOURI, AND EMANUEL HAGSTROM, OF CHICAGO, ILLINOIS; SAID EMANUEL HAGSTROM ASSIGNOR TO SAID GUSTAF A. HAGSTROM.

DETACHABLE TIRE-TREAD.

1,173,424.   Specification of Letters Patent.   Patented Feb. 29, 1916.

Application filed October 5, 1914. Serial No. 865,052.

*To all whom it may concern:*

Be it known that we, GUSTAF A. HAGSTROM and EMANUEL HAGSTROM, citizens of the United States, residing at Kansas City and Chicago, in the counties of Jackson and Cook and States of Missouri and Illinois, respectively, have invented certain new and useful Improvements in Detachable Tire-Treads, of which the following is a specification.

Our invention relates to detachable tire treads, and one object is to provide a simple and inexpensive tread which can be readily applied to or removed from a tire.

A further object is to provide a lighter tread than usual, without sacrificing the strength or durability of said tread.

Another object is to provide a tread having openings therein, so that water, sand, or other deleterious substances working in between the tire and the tread may pass out through said openings before damaging the tire.

Other objects of the invention will hereinafter appear, and in order that said invention may be fully understood, reference will now be made to the accompanying drawing, in which:

Figure 1 is a broken side elevation of our tire tread in position upon a tire. Fig. 2 is a broken plan view, enlarged, of the tire tread removed from the tire. Fig. 3 is an irregular cross section, enlarged, on line III—III of Fig. 1. Fig. 4 is a broken detail of a strip of material constituting a part of the tire tread.

A designates a pneumatic tire of the clencher type mounted upon a rim B.

1 designates the tire tread constituting the present invention. Said tire tread is of sufficient width to come well over the sides of the tire A, to protect said sides when traveling in ruts, etc. Tread 1 consists of a plurality of strips 2 braided together as shown on the drawing. Strips 2 may consist of leather, fabric, or other suitable material. Each strip has wide and narrow portions 3 and 4, respectively, the wide portions 3 being arranged midway between the sides of the tread to present a broad wearing surface to the road and also to cause said tread to snugly fit the curvature of the tire A. In braiding the strips 2 together, openings 5 are left, so that sand or other deleterious substances working in between the tire and tread may pass out through said openings before damaging the tire. The spaces 5 also admit air to dry up any moisture working in between the tire and the tread, so that these parts will not rot out. Said air also prevents the tire A from unduly heating and blowing out on the road. The spaces 5 also materially lighten the tread without diminishing its strength or wearing qualities.

6 designates rivets which firmly unite the intersecting portions of the strips 2. The outer ends of said rivets have burred heads 7, which protect the strips 2 from wear and prevent the tire from skidding.

8 designates a pair of split rings passing through loop portions 9 of the strips 2. Each ring 8 has right and left threads at its ends to receive a turnbuckle or an elongated nut 10, whereby said rings are tightened to draw the tread 1 firmly about the tire A.

While the rings 8 are ordinarily sufficient to hold the tread upon the tire A, to insure absolute safety we provide one of said rings with a plurality of clips 11, slidable upon said ring and adapted to engage one of the inturned lips *b* of the rim B, against which it is firmly held by the inflated tire A and by the strips 2 which overlap and underlap the corners of the hooks.

While we have shown the clips 11 shaped to engage a clencher tire, it is obvious that they may be formed for use in connection with straight-wall or other types of tires without departing from the spirit or scope of the invention. The tread is placed in position upon the tire A, when the same is deflated, so that the clips 11 can be readily inserted between the tire A and the rim B. The clips 11 each have a pair of hooks engaged with the rings 9, which hooks are spaced apart a distance slightly greater than the width of the strips 2 so as to receive the latter in such space. The strips 2 are engaged over and under the side edge and end portions of the hooks. Each clip is adapted to be engaged with or to receive any one of the strips in the space between its two hooks thus allowing the clips to be applied wherever desired.

From the foregoing description, it is apparent that we have produced a tire tread embodying the features of advantage above enumerated; and while we have shown and described the preferred form of the invention, we of course reserve the right to make such changes in the combination, arrangement and proportion of parts as properly fall within the spirit and scope of the claim.

Having thus described our invention, what we claim and desire to secure by Letters Patent, is:

In a tire tread, side rings, flexible strips wound over and under the rings, and attaching clips each having a pair of hooks engaged with the rings, said hooks being spaced apart a distance slightly greater than the width of the strips so as to receive one of the latter in said space and said strips being engaged over and under the side edge and end portions of the hooks, each of said clips being adapted to receive any one of the strips in the space between its hooks so as to allow the clips to be applied at any and as many points as desired throughout the entire circumference of the tread.

In testimony whereof we affix our signatures in the presence of witnesses.

GUSTAF A. HAGSTROM.
EMANUEL HAGSTROM.

Witnesses:
F. G. FISCHER,
L. J. FISCHER,
CARL E. LONNQUIST,
R. W. PAMORSKI.

Copies of this patent may be obtained for five cents each, by addressing the "Commissioner of Patents, Washington, D. C."